United States Patent
Kothari et al.

(10) Patent No.: US 11,511,534 B2
(45) Date of Patent: Nov. 29, 2022

(54) IDENTIFYING PASSES OF ADDITIVE MANUFACTURING PROCESSES DEPICTED IN THERMAL IMAGES

(71) Applicant: HEWLETT-PACKARD DEVELOPMENT COMPANY, L.P., Spring, TX (US)

(72) Inventors: Sunil Kothari, Palo Alto, CA (US); Juan Carlos Catana, Guadalajara (MX); Tod Heiles, Vancouver, WA (US); Jun Zeng, Palo Alto, CA (US); Gary J. Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 486 days.

(21) Appl. No.: 16/606,767

(22) PCT Filed: Mar. 19, 2018

(86) PCT No.: PCT/US2018/023115
§ 371 (c)(1),
(2) Date: Oct. 20, 2019

(87) PCT Pub. No.: WO2019/182552
PCT Pub. Date: Sep. 26, 2019

(65) Prior Publication Data
US 2020/0130343 A1    Apr. 30, 2020

(51) Int. Cl.
*B33Y 10/00*    (2015.01)
*B33Y 30/00*    (2015.01)
(Continued)

(52) U.S. Cl.
CPC ............... *B33Y 10/00* (2014.12); *B33Y 30/00* (2014.12); *B22F 10/30* (2021.01);
(Continued)

(58) Field of Classification Search
None
See application file for complete search history.

(56) References Cited

U.S. PATENT DOCUMENTS

| | | |
|---|---|---|
| 2015/0061170 A1 | 3/2015 | Engel et al. |
| 2017/0057170 A1 | 3/2017 | Gupta et al. |

(Continued)

FOREIGN PATENT DOCUMENTS

| | | |
|---|---|---|
| WO | WO2017012663 A1 | 1/2017 |
| WO | WO2017054842 A1 | 4/2017 |

*Primary Examiner* — Colin W. Slifka
(74) *Attorney, Agent, or Firm* — Tong Rea Bentley & Kim LLC (57) ABSTRACT

In an example, an apparatus includes an image processing system, a print engine, and a vision system. The image processing system generates electronic signals based on a model of an object to be fabricated using an additive manufacturing process. The print engine performs the additive manufacturing process in a plurality of passes based on the electronic signals. The vision system acquires a plurality of thermal images of the plurality of passes and assigns individual passes to individual images based on data acquired during a build of a calibration object by the additive manufacturing process. The print engine may further include a material coater to spread a powder coating material, a plurality of fluid ejection devices to eject a fusing agent, and an emitter to emit energy to fuse the fusing agent and the powder coating material into a layer of the object to be fabricated.

12 Claims, 8 Drawing Sheets

(51) Int. Cl.
  *B33Y 50/02* (2015.01)
  *B29C 64/153* (2017.01)
  *B29C 64/393* (2017.01)
  *B29C 64/165* (2017.01)
  *B22F 10/30* (2021.01)

(52) U.S. Cl.
  CPC ......... *B22F 2999/00* (2013.01); *B29C 64/153* (2017.08); *B29C 64/165* (2017.08); *B29C 64/393* (2017.08); *B33Y 50/02* (2014.12)

(56) References Cited

U.S. PATENT DOCUMENTS

| | | |
|---|---|---|
| 2017/0220031 A1 | 8/2017 | Morovic et al. |
| 2017/0297095 A1 | 10/2017 | Zalameda et al. |
| 2017/0326788 A1 | 11/2017 | Alvarez et al. |

IDENTIFYING PASSES OF ADDITIVE MANUFACTURING PROCESSES DEPICTED IN THERMAL IMAGES

BACKGROUND

Additive manufacturing processes (also referred to as "three-dimensional printing" processes) are often used to fabricate three-dimensional objects. High-resolution thermal images of an object being fabricated may be captured at various stages of the additive manufacturing process. These thermal images may be useful in predicting the strength of the completed object.

DETAILED DESCRIPTION

The present disclosure broadly describes an apparatus, method, and non-transitory computer-readable medium for identifying passes of additive manufacturing processes depicted in thermal images. As discussed above, high-resolution thermal images of an object being fabricated may be captured at various stages of the additive manufacturing process. These thermal images may be useful in predicting the strength of the completed object.

The accuracy of such predictions is dependent in part upon the correct assignment of layers and passes to the images. That is, knowing which layer of the object and which pass of the additive manufacturing system is depicted in a given image helps to ensure that the predicted properties of the completed object are closer to the actual properties. Conventional approaches for assigning layers and/or passes to images, however, tend to result in many false assignments. In addition, some additive manufacturing processes may involve changes in the powder coating material that is fused to form the object. Changing the powder may result in changes to the firmware parameters of the additive manufacturing system. Changes in the firmware parameters may, in turn affect the temperature that is reached in a given pass of the additive manufacturing system, the speed of a given pass, the number of passes involved in building the object, and/or the observable area of the additive manufacturing system's build bed. Changes in one or more of these parameters may also make it more challenging to correctly assign layers and/or passes to images.

Examples of the present disclosure identify which layer and/or pass of an additive manufacturing system is depicted in a thermal image, based on an analysis of the passes of the additive manufacturing system during the building of a test object. In one example, a plurality of identical test objects is built using the additive manufacturing system. Thermal images are taken during each pass of the additive manufacturing system during the building of the test objects, and each thermal image is assigned to a particular layer and/or pass of the test objects. From the thermal images, the temperature ranges that are present during each pass of the additive manufacturing system can be identified and recorded. Subsequently, the additive manufacturing system is used to build a non-test object. As each layer of the non-test object is built, the thermal images for that layer are acquired. The median temperature in a predefined region of interest can be compared to the recorded temperature ranges in order to predict which passes may be depicted in each image. In further examples, knowledge of the movement patterns of the fusing carriage in other regions of interest can be used in combination with knowledge of the temperature ranges to refine the pass prediction.

Within the context of the present invention, a "pass" of an additive manufacturing system comprises a movement of the fusing carriage (i.e., the component that dispenses the powder and/or fusing agents and/or houses emitters for facilitating fusing) or a movement of a spreader (i.e., the component that dispenses and/or spreads the powder over the build bed) in one direction, i.e., from one end of the build bed to the opposite end. Within the context of the present invention, a "layer" of a three-dimensional object comprises a cross section or slice of the object that is fabricated by fusing of the powder into a solid form. A layer of the three-dimensional object may be built in multiple passes.

Examples of the present disclosure are discussed within the context of a multi jet fusion system. In a multi jet fusion system, a computer controls the spreading of powder and jetting of fusing agents to form successive layers of material according to a digital model of an object. The fusing agent causes the powder to fuse under certain conditions, such as exposure to heat or energy. Thus, as the successive layers fuse to each other, a three-dimensional object is formed. It should be noted, however, that the described examples may be equally applicable to other types of additive manufacturing systems, including systems based on three-dimensional binder jetting. Thus, any references to "fusing" agents could be applicable to "binding" agents as well.

Figure 1:
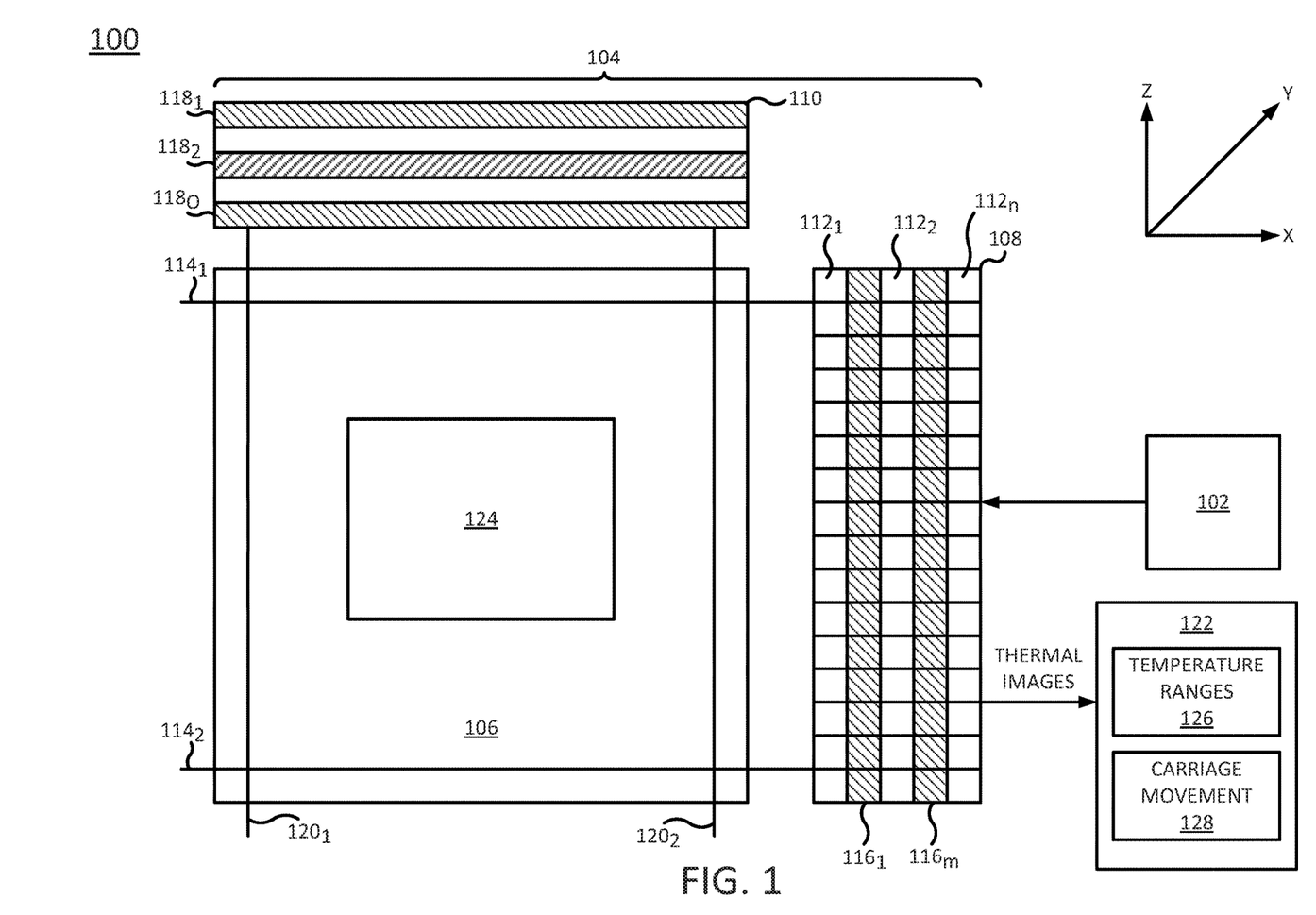
FIG. 1 illustrates a block diagram of a top view of an example system of the present disclosure.

FIG. 1 illustrates a block diagram of a top view of an example system 100 of the present disclosure. In one example, the system 100 is a fluid ejection system, such as an additive manufacturing system using inkjet technology. The system 100 generally includes an image processing system 102, a print engine 104, and a vision system 122. The image processing system 102 and print engine 104 work together to fabricate a three-dimensional object 124 via selective addition of a material, such as powder and a fusing agent. The vision system 122 monitors the fabrication of the three-dimensional object 124, e.g., by capturing thermal (e.g., infrared) images of the three-dimensional object 124 during various stages of fabrication.

In one example, the image processing system 102 comprises a computing device (e.g., a general purpose computing device or a special purpose computing device) that stores a model of the object 124. In one example, the object 124 is fabricated by the print engine 104 in a series of layers that are fused together. Thus, the model of the object 124 may comprise a plurality of cross sections or slice images that are reproduced by the print engine 104 in powder and fusing agent, where each slice image corresponds to one or more of the layers of the object 124.

The image processing system 102 sends electronic signals to the print engine 104. These electronic signals, in turn, drive the components of the print engine 104 (discussed in further detail below) to cooperate to fabricate the object 124. Although the image processing system 102 is illustrated as being external or separate from the print engine 104, some image processing system functions may be performed by the print engine 104, or vice versa. Thus, the system illustrated in FIG. 1 shows one example configuration that may be used to implement the functionality of the image processing system 102 and the print engine 104.

In one example, the print engine 104 comprises a build bed 106, a movable fusing carriage 108, and a moveable spreader 110. The build bed 106 comprises a working area upon which the object 124 is fabricated, and may comprise a substantially flat, planar space.

The moveable fusing carriage 108 includes a plurality of fluid ejection modules $112_1$-$112_n$ (hereinafter collectively referred to as "fluid ejection modules 112"), each of which may be controlled by a respective fluid ejection module controller (not shown) that receives electronic signals from the image processing system 102. Each fluid ejection module 112 may include a plurality of fluid ejection devices (e.g., dies, pens, nozzles, or the like) for ejecting fusing agents (and, potentially detailing agents, binding agents, and/or other agents). The fluid ejection devices may be of the type used in high-speed commercial inkjet printing presses. The moveable fusing carriage 108 also includes at least one emitter $116_1$-$116_m$ (hereinafter collectively referred to as "emitters 116") for emitting energy (e.g., heat, light, acoustic energy, etc.). The fluid ejection modules 112 and emitter(s) 116 may be arranged as alternating modules on the surface of the moveable fusing carriage 108.

In one example, the moveable fusing carriage 108 is moveable in at least two dimensions (or, along two axes of a three-dimensional coordinate plane). In the example illustrated in FIG. 1, the moveable fusing carriage 108 is moveable along the x dimension (e.g., from left to right across the page of FIG. 1, or along the dimension parallel to the plane of the build bed 106) and along the y dimension (e.g., into the page of FIG. 1, or along the dimension perpendicular to the plane of the build bed 106). In this case, a first set of tracks $114_1$ and $114_2$ supports the moveable fusing carriage 108 for movement along the x dimension, while a second set of tracks (not shown) supports the moveable fusing carriage 108 for movement along the y dimension.

The moveable spreader 110 includes at least one material coater $118_1$-$118_o$ (hereinafter collectively referred to as "material coaters 118"). The material coaters 118 may include blades, rollers, or the like for dispensing and spreading a coating material. The moveable spreader 110 may also include a reservoir (not shown) of the coating material. The coating material may be dispensed in powder form and may comprise a polymer or a polymer-containing composite.

The moveable spreader 110 is moveable in at least two dimensions (or, along two axes of a three-dimensional coordinate plane). In the example illustrated in FIG. 1, the moveable spreader 110 is moveable along the z dimension (e.g., from top to bottom across the page of FIG. 1, or along the dimension parallel to the plane of the build bed 106 and perpendicular to the dimension along which the moveable fusing carriage 108 moves) and along the y dimension (e.g., into the page of FIG. 1, or along the dimension perpendicular to the plane of the build bed 106). In this case, a first set of tracks $120_1$ and $120_2$ supports the moveable spreader 110 for movement along the z dimension, while a second set of tracks (not shown) supports the moveable spreader 110 for movement along the y dimension.

In another example, the moveable fusing carriage 108 and moveable spreader 110 may be moveable along the same axis (e.g., along the x dimension or along the z dimension). Thus, in some examples, the moveable fusing carriage 108 and moveable spreader 110 do not move along separate axes or dimensions.

In operation, a thin base layer of coating material (e.g., powder) may be coated on the build bed 106 by the moveable spreader 110 (e.g., by one or more of the material coaters 118) moving in a first direction along the z dimension (e.g., in a first "pass" of the moveable spreader 110).

Next, the moveable fusing carriage 108 is moved to the appropriate height (e.g., according to the object model) along the y dimension, and then passes across the build bed 106 in a first direction along the x dimension (e.g., in a first "pass" of the moveable fusing carriage 108). As the moveable fusing carriage 108 passes across the build bed, it lays down a first layer of a fusing agent over at least a portion of the powder. The first layer of the fusing agent may also contain detailing agents or other agents. The emitters 116 of the moveable fusing carriage 108 may also emit energy during this pass, or they may emit energy in a separate pass that does not involve dispensing fusing agents. Application of the energy to the first layer of fusing agent causes the fusing agent to absorb the energy, which in turn causes at least some of the powder to fuse or solidify into a portion of a first layer of the object 124.

The moveable fusing carriage 108 (and, in some examples, the moveable spreader 110) may make subsequent passes, reversing direction each time along the z and x dimensions, respectively. Each pass may also move the height of the moveable fusing carriage 108 and the moveable spreader 110 higher along the y dimension. These subsequent passes build up the layers of the object 124, or fabricate additional layers of the object 124 which fuse to the prior layers, until the object is fully fabricated.

As the moveable fusing carriage 108 (and, in some examples, the moveable spreader 110) makes passes across the build bed 106 to fabricate the layers of the object 124, the vision system 122 acquires a plurality of thermal images of the object 124. The vision system 122 may include one or more image capturing devices (not shown), such as one of more forward looking infrared (FLIR) cameras. Thus, the plurality of thermal images may include infrared images. The plurality of thermal images may be acquired from above the build bed 106, looking down onto the object 124.

The vision system 122 may store various data related to a calibration of the system 100 that involves the building of one or more calibration objects using a specific powder/coating material and/or recipe (i.e., a setting of firmware parameters that control, for instance, the pulse width modulation of the lamps of the moveable fusing carriage, the temperature of the rollers or blades of the moveable spreader, and/or the number and kind of passes employed to fuse layers of the object). This data may include temperature ranges 126 that are recorded in various regions of the build bed during various passes of the moveable fusing carriage 108 and/or moveable spreader 110, as well as movement patterns 128 of the moveable fusing carriage 108 and/or moveable spreader 110. Using knowledge of the temperature ranges 126 and/or carriage movement patterns 128, the vision system 122 may assign individual thermal images of the plurality of thermal images to a specific layer of the object 124 and/or to a specific pass of the moveable fusing carriage 108 and/or moveable spreader 110.

As discussed above, the system 100 illustrates one example of an additive manufacturing system that uses inkjet technology (e.g., multi jet fusion). Other additive manufacturing systems may use different types of technology that include additional components, or omit some of the components illustrated in FIG. 1. For instance, an additive manufacturing system that uses three-dimensional binder jetting technology may not include any emitters for emitting energy. In addition, other multi jet fusion systems may be arranged in a different manner. For instance, the moveable fusing carriage 108 may be configured to dispense the coating material as well as the fusing agent and/or other agents.

Figure 2:
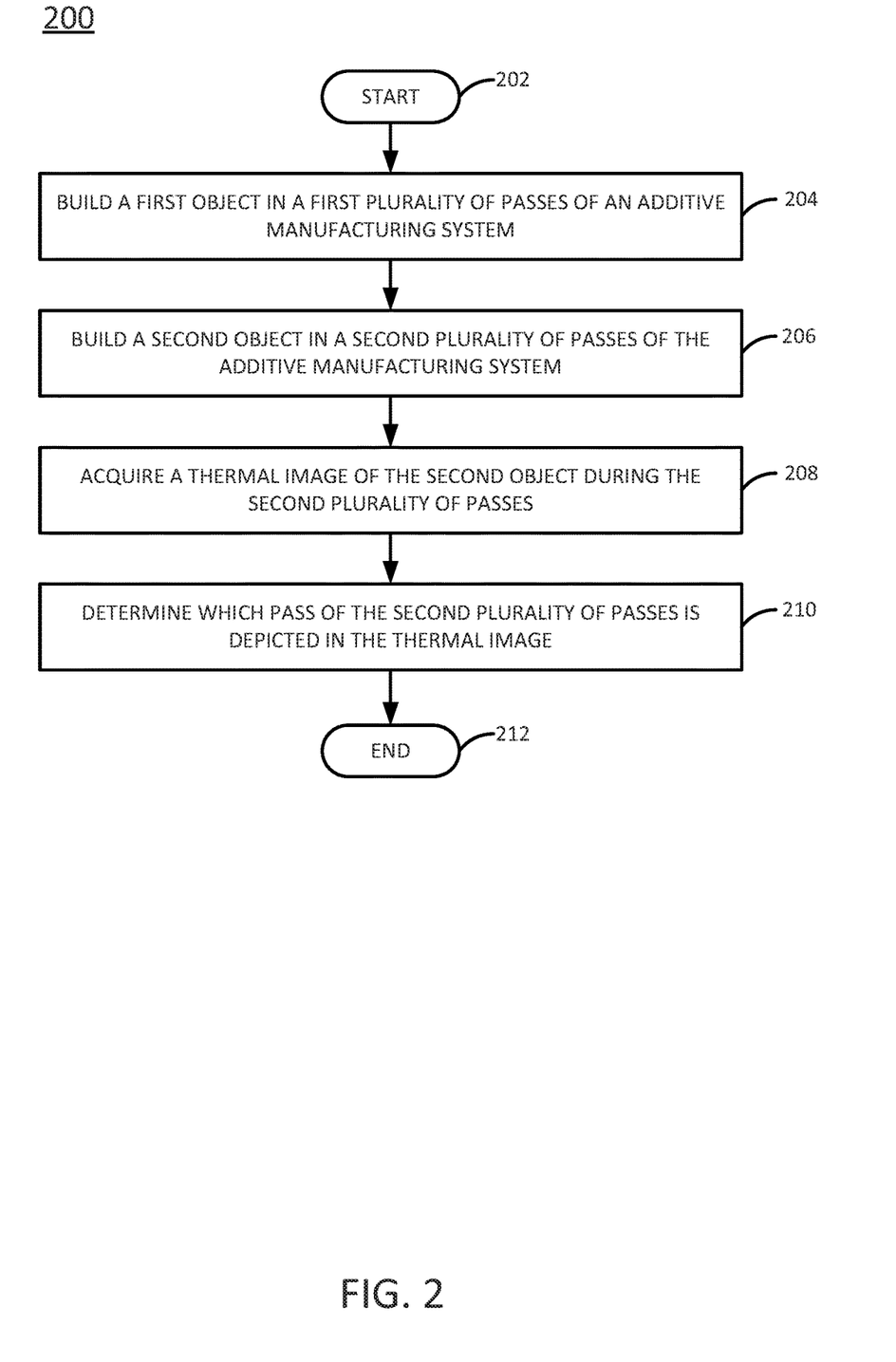
FIG. 2 illustrates a flowchart of an example method for fabricating an object via an additive manufacturing process.

FIG. 2 illustrates a flowchart of an example method 200 for fabricating an object via an additive manufacturing process. The method 200 may be performed, for example, by the system 100 illustrated in FIG. 1. As such, reference may be made in the discussion of FIG. 2 to various components of the system 100 to facilitate understanding. However, the method 200 is not limited to implementation with the system illustrated in FIG. 1.

The method 200 begins in block 202. In block 204, a first object is built in a first plurality of passes of an additive manufacturing system. In one example, the first object is a calibration object whose fabrication is used to acquire information about the additive manufacturing system (e.g., temperature ranges over time, movement patterns of components, etc.). The calibration object may comprise a plurality of layers and may be built using a particular powder and recipe (e.g., a setting of firmware parameters that control, for instance, the pulse width modulation of the lamps of the moveable fusing carriage, the temperature of the rollers or blades of the moveable spreader, and/or the number and kind of passes employed to fuse layers of the object). In one example, the first object is a singular calibration object; however, in other examples, the first object may be one of a plurality of identical calibration objects (or a "batch" of calibration objects) that is built simultaneously in the first plurality of passes. In one example, the first plurality of passes includes at least one pass (e.g., in one direction) of a fusing carriage of the additive manufacturing system.

As discussed in greater detail below, various data is acquired during the first plurality of passes. This data may include, for example, temperature ranges that are present in the build bed during the first plurality of passes, areas of the build bed that are subject to permanent or occasional occlusion (i.e., blocked from the view of the additive manufacturing system's vision system). At least some of this data may be acquired from thermal images captured by the vision system of the additive manufacturing system.

In block 206, a second object is built in a second plurality of passes of the additive manufacturing system (i.e., the same additive manufacturing system used to build the first object in block 204). In one example, the second object is built using the same powder and recipe as the first object.

In block 208, a thermal image of the second object during the building (e.g., during execution of second plurality of passes in block 206) is acquired. The thermal image may comprise an infrared image acquired by a FLIR camera of the additive manufacturing system's vision system, for instance.

In block 210, it is determined which pass of the second plurality of passes is depicted in the thermal image acquired in block 208. This determination may be made based on an analysis of the data acquired during the first plurality of passes that was executed in block 204.

The method 200 ends in block 212.

Figure 3:
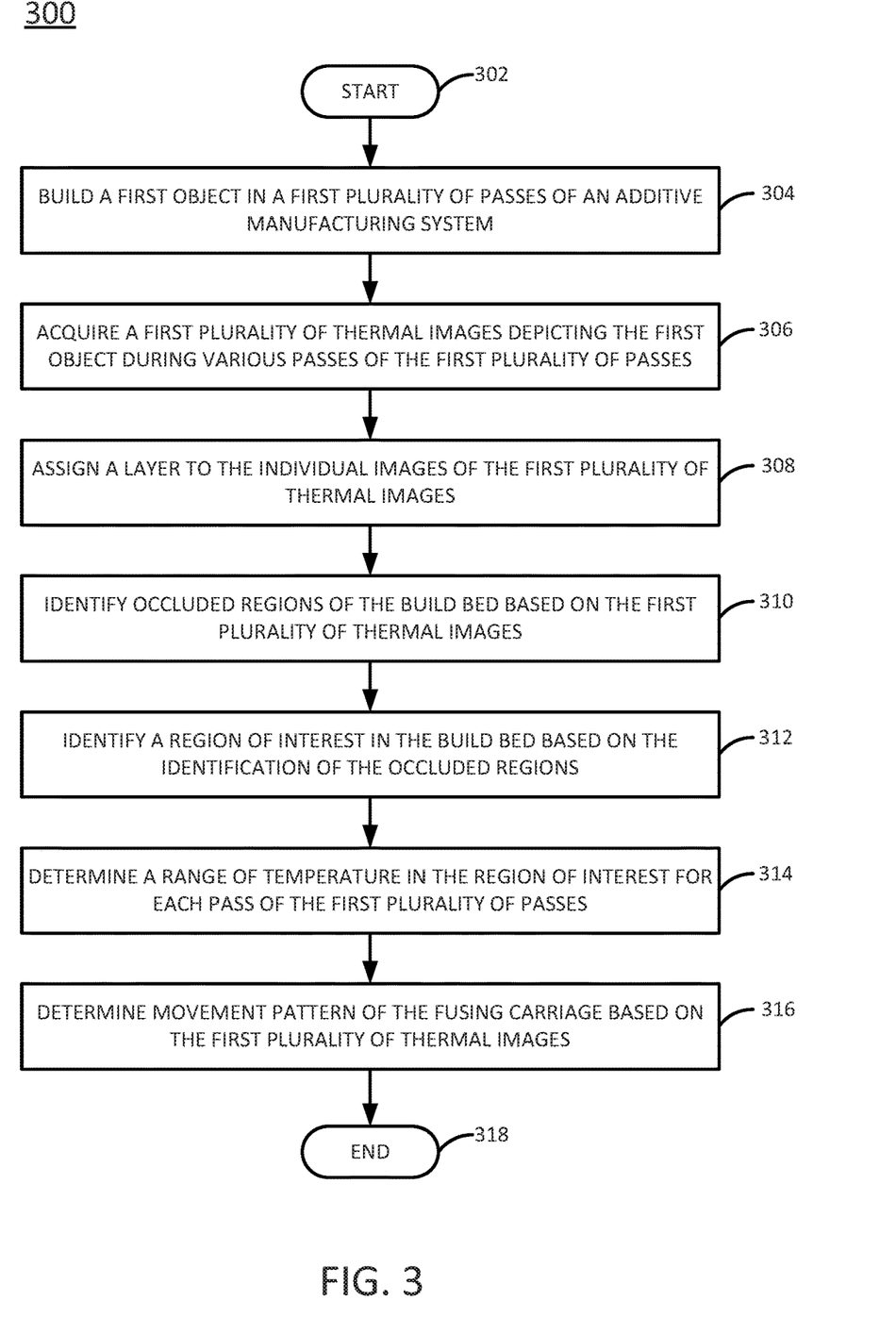
FIG. 3 illustrates a flowchart of an example method for calibrating an additive manufacturing system.

FIG. 3 illustrates a flowchart of an example method 300 for calibrating an additive manufacturing system. The method 300 specifies further details for performing block 204 of the method 200. Thus, the method 300 may be performed by the system 100 illustrated in FIG. 1. As such, reference may be made in the discussion of FIG. 3 to various components of the system 100 to facilitate understanding. However, the method 300 is not limited to implementation with the system illustrated in FIG. 1.

The method 300 begins in block 302. In block 304, a first object is built in a first plurality of passes of an additive manufacturing system. In one example, the first object is a calibration object whose fabrication is used to acquire information about the additive manufacturing system. The calibration object may comprise a plurality of layers and may be built using a particular powder and recipe (e.g., a setting of firmware parameters that control, for instance, the pulse width modulation of the lamps of the moveable fusing carriage, the temperature of the rollers or blades of the moveable spreader, and/or the number and kind of passes employed to fuse layers of the object). In one example, the first object is a singular calibration object; however, in other examples, the first object may be one of a plurality of identical calibration objects that is built simultaneously in the first plurality of passes. In one example, the first plurality of passes includes at least one pass (e.g., in one direction) of a fusing carriage of the additive manufacturing system.

In one example, the additive manufacturing system's build bed may be divided into a plurality of regions during block 304, where no calibration object is positioned in more than one of the regions. Additionally, as each layer of the first object is built, the first plurality of passes may also build a marker that indicates which layer is currently being built. For example, as the first layer of the first object is being built, the marker may also be modified (through deposition of powder and fusing agent) to display the number "X" or "X of Y" (where Y denotes the total number of layers in the first object). In one example, the image processing system of the additive manufacturing system may design the slice image associated with each layer to include the corresponding marker for that layer.

In block 306, a first plurality of thermal images are acquired, e.g., by the additive manufacturing system's vision system. The first plurality of thermal images depict the first object during various stages of the building that is performed in block 304 (i.e., during various passes of the first plurality of passes). The first plurality of thermal images may include, for example, infrared images acquired by one or more FLIR cameras of the vision system.

In block 308, a layer of the first object is assigned to the individual images of the first plurality of thermal images. It should be noted that several thermal images may be assigned to the same layer number, since each layer may be built in multiple passes, and thermal images of the build bed may be captured multiple times during each pass. In one example, the layer is assigned by reading the number off of a marker that is depicted in the image, where the marker is modified as each layer is built, e.g., as described above. In another example, the layer is assigned based on a timestamp associated with the image.

In block 310, occluded regions of the build bed are identified based on the first plurality of thermal images. In one example, the occluded regions may be permanently or occasionally blocked from the view of the vision system. For instance, as the additive manufacturing system's fusing carriage moves across the build bed, it may block a portion of the build bed from the vision system's view. By identifying the occluded regions based on thermal images (rather than, say, RGB images), the occlusions are referenced to the build bed, which is an invariant across all passes in the first plurality of passes.

In block 312, a region of interest in the build bed is identified based on the identification of the occluded regions. In one example, the region of interest is a region from which measurements of temperature ranges will be taken. In another example, the region of interest is a region of the build bed in which movement patterns of the moveable fusing carriage and/or moveable spreader may be monitored. Thus, a plurality of regions of interest may be identified, where, for instance, a first region of interest is a region in which temperature is monitored, and a second region of interest is a region in which movement patterns of the moveable fusing carriage and/or moveable spreader are monitored. In one example, the region of interest identified in block 312 is a region of the build bed that is visible in all images of the first plurality of thermal images (e.g., a region that is not subject to occlusion). If there are no regions that are visible in all of the images of the first plurality of images, then the region that is visible in the greatest number of the images may be selected instead. In one example, more than one region of interest may be identified.

In block 314, a range of temperatures in the identified region of interest is determined for each pass of the first plurality of passes, based on the first plurality of thermal images. In one example, the temperature data from the first plurality of thermal images is used to generate a temporal plot that plots the temperature in the region of interest against time. The temperatures indicated in the temporal plot may be averaged over the region of interest (e.g., over the temperatures of the portions of the first object that reside in the region of interest). In one example, both a highest observed temperature and a lowest observed temperature may be recorded for each pass. In some cases, the temperature ranges for different passes may overlap to some extent. The temperature ranges that are determined in block 314 may be specific to a given powder and/or recipe.

In block 316, the movement pattern of the additive manufacturing system's fusing carriage is determined based on the first plurality of thermal images. The movement pattern may comprise side-to-side movements of the fusing carriage (e.g., back and forth along the x direction in FIG. 1) as well as turnarounds (e.g., reversals of direction along the x direction). In one example, movement of the fusing carriage occludes the vision system's view of the build bed; thus, by examining the sizes and locations of the occlusions in a given sequence of images, the direction of movement can be determined.

Figure 4:
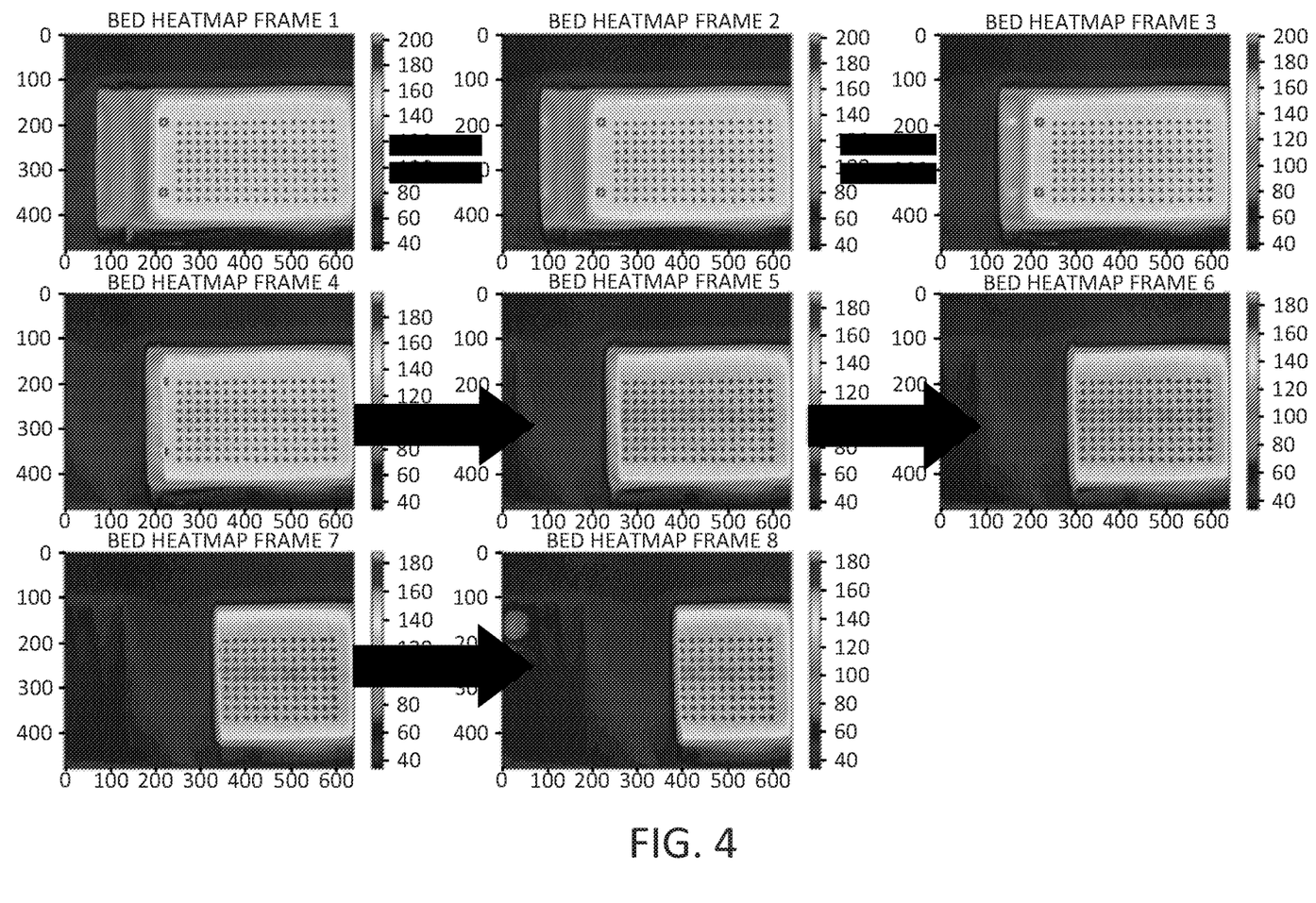
FIG. 4 illustrates an example sequence of thermal images or "heatmaps" of an example build bed.

FIG. 4, for instance, illustrates an example sequence of thermal images or "heatmaps" of an example build bed. As illustrated, the occluded portion of the build bed appears to increase in size on the left-hand side of the images as one moves through the sequence, while the visible portion of the build bed (on the right-hand side of the images) appears to shrink. It may therefore be determined from this sequence of thermal images that the fusing carriage is moving from the left to the right. In other words, where the occluded regions appear to move across a sequence of consecutive images, the direction in which the fusing carriage is moving may be determined from the "movement" of the occluded regions.

In one example, the direction of movement from image-to-image is recorded once determined. For instance, it may be recorded that the fusing carriage is moving to the left from image 1 to image 2, from image 2 to image 3, and from image 3 to image 4 (e.g., such that a sequential movement is tracked across images 1-4 in the associated pass); is not moving in either direction from image 4 to image 5; and is moving to the right from image 5 to image 6, image 6 to image 7, and image 7 to image 8. When the fusing carriage is not moving in either direction, it may be assumed to be performing a turnaround (e.g., either inside the space of the build bed or outside of this space). The movement pattern for a series of frames may be stored in shorthand, where an L denotes a movement to the left, an R denoted a movement to the right, and an N denotes no movement/turnaround. Thus, the movement pattern in the example eight frames described above could be stored in shorthand as {LLLNRRR}. The movement pattern of the fusing carriage, as well as the temperature ranges, may be used to disambiguate between different passes of the additive manufacturing system as described in further detail in connection with FIG. 5.

The method 300 ends in block 318.

Figure 5:
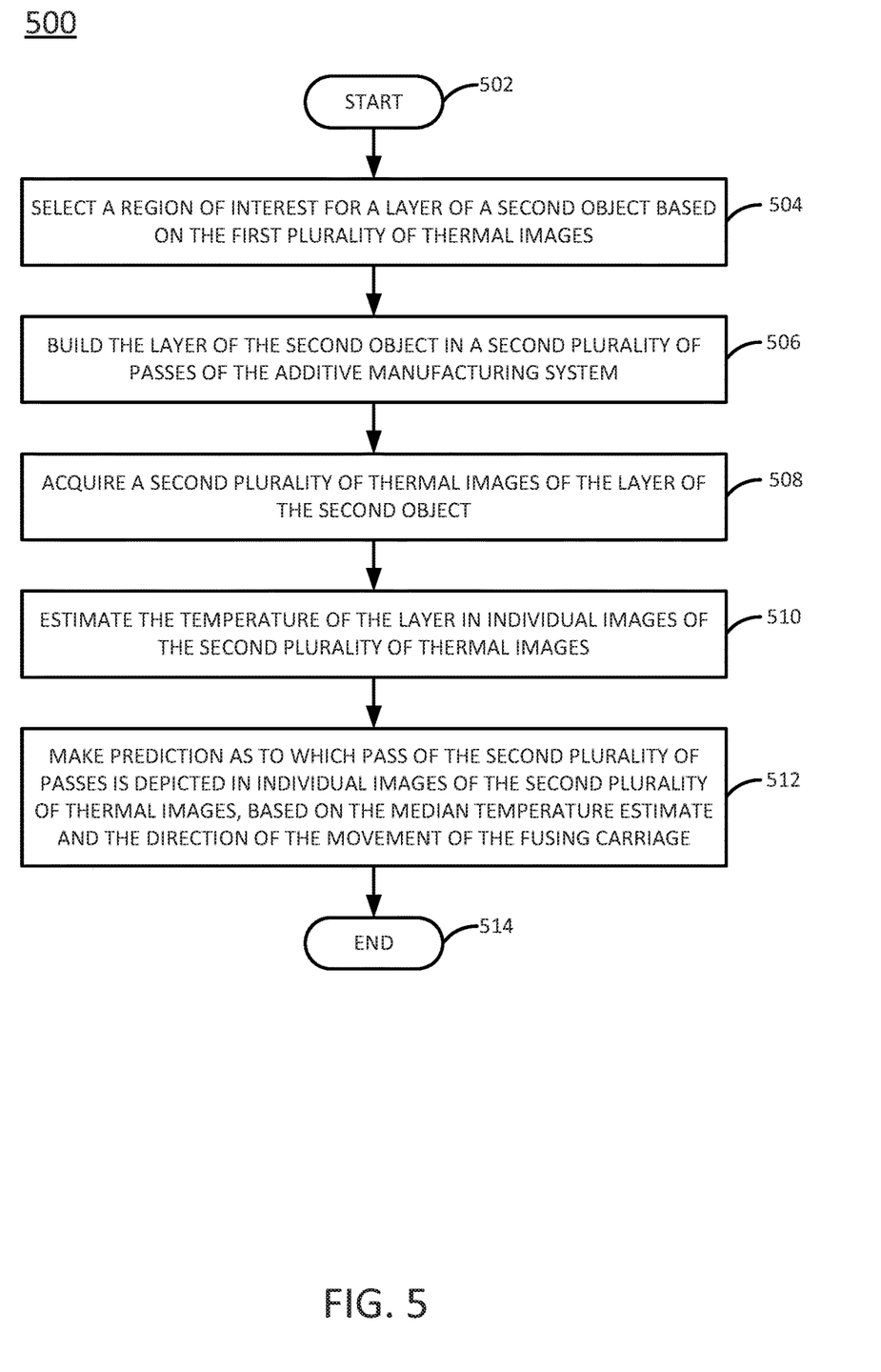
FIG. 5 illustrates a flowchart of an example method for identifying a pass of an additive manufacturing process depicted in a thermal image.

FIG. 5 illustrates a flowchart of an example method 500 for identifying a pass of an additive manufacturing process depicted in a thermal image. The method 500 specifies further details for performing blocks 206-210 of the method 200. Thus, the method 500 may be performed by the system 100 illustrated in FIG. 1. As such, reference may be made in the discussion of FIG. 5 to various components of the system 100 to facilitate understanding. However, the method 500 is not limited to implementation with the system illustrated in FIG. 1.

The method 500 assumes that the method 300 has been performed first, i.e., that a first object has been built by the additive manufacturing system and that analysis of the building of the first object has yielded information about temperature ranges and occlusions in the build bed. This information is used in the method 500 to help assign passes and/or layers to thermal images that are captured during the building of a second object by the additive manufacturing system.

The method 500 begins in block 502. In block 504, a region of interest is selected for a layer of the second object that is about to be built. In one example, the region of interest comprises a region (potentially one of several regions) of the layer at which the temperature will be measured. In another example, the region of interest may comprise a region (potentially one of several regions) of the build bed in which movement of the moveable fusing carriage and/or moveable spreader is monitored. Regions of interest for monitoring movement of the moveable fusing carriage and/or moveable spreader may be defined in areas of the build bed that do not contain the object/layer or in areas around the periphery of the build bed. In one example, the region of interest is selected based on knowledge of which areas of the build bed are occluded, which may be obtained from the building of the first object according to the method 300 (i.e., from the first plurality of thermal images). For instance, the region of interest may be a region of the build bed that was shown to be subject to relatively little or no occlusion. The location of the region of interest may vary from one layer of the second object to the next layer. That is, each layer of the second object may have a different region (or different regions) of interest.

Figure 6:
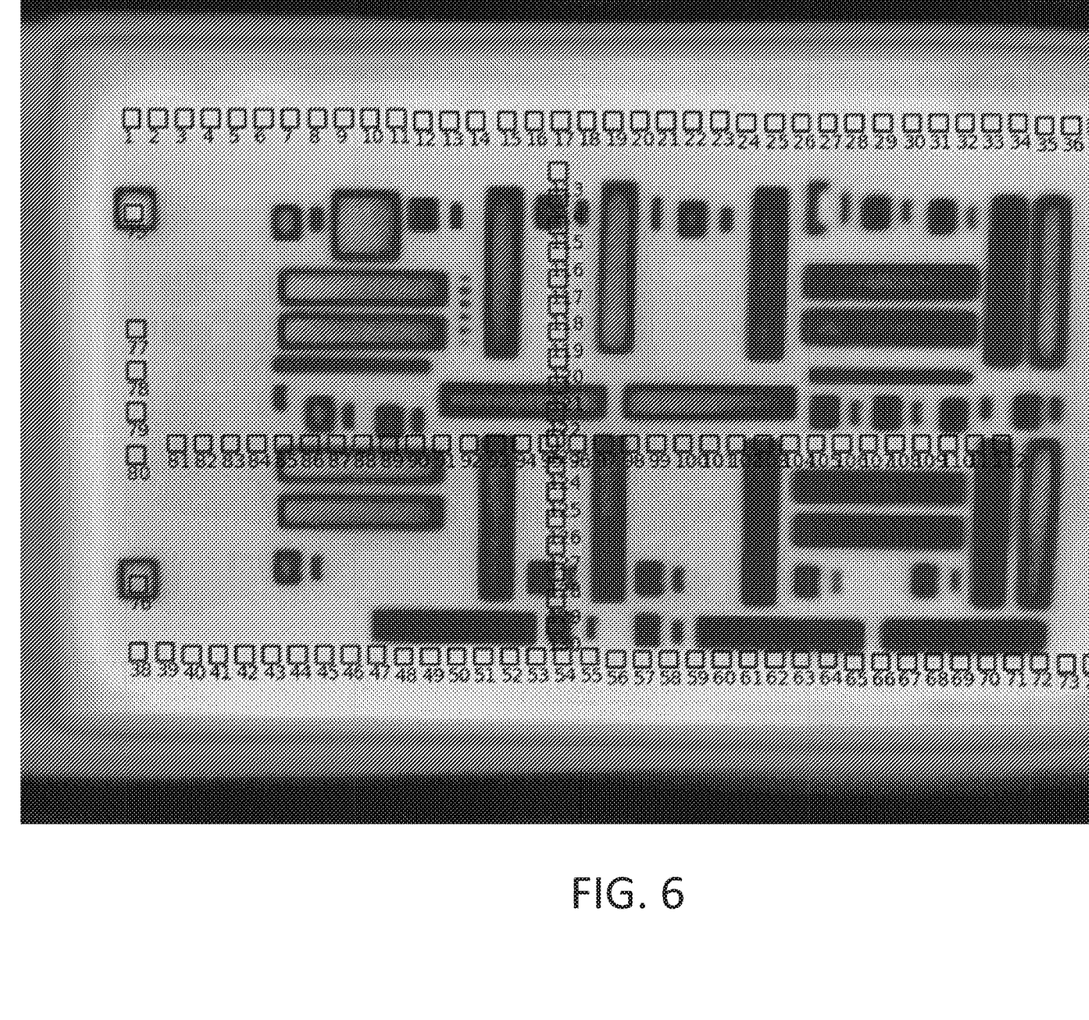
FIG. 6 illustrates an example thermal image of an example build bed in which a series of regions of interest is defined.

Within the region of interest, it may not be known exactly where the object (or objects) being fabricated is located. If the location of the object being fabricated is not known, a randomized strategy may be employed in which scanning is performed from left to right and top to bottom on some predefined regions of interest until multiple occurrences of significant temperature differences are detected. FIG. 6, for instance, illustrates an example thermal image of an example build bed in which a series of regions of interest is defined. As illustrated in FIG. 6, a plurality of regions of interest cross at approximately a center line of the build bed. Higher temperatures in the thermal image (indicated by darker regions) are associated with objects being fabricated, while lower temperatures (indicated by lighter regions) are associated with powder or coating material.

In block 506, the layer of the second object is built in a second plurality of passes of the fusing carriage and/or spreader. For instance, the layer may be built as discussed above in connection with FIG. 1. In one example, a layer number associated with the layer (e.g., X, or X of Y) is also built in at least one pass of the second plurality of passes, in a region that is visible to the additive manufacturing system's vision system.

In block 508, a second plurality of thermal images of the layer of the second object is acquired, e.g., from the additive manufacturing system's vision system. In one example, each thermal image of the second plurality of thermal images is a raw FLIR image. A given thermal image may be determined to be associated with the layer based on a one-pass image detection technique that detects a layer number (e.g., X or X of Y) that has been built on the build bed, along with the layer. In a further example, a deep learning technique can be used to identify each digit of the layer number. The second plurality of thermal images may be grouped together based on identification of the same layer number in each of the images. Alternatively, the second plurality of thermal images may be grouped together based on a combination of an identification of the same layer in each of the images and identification of a serial number that is issued and incremented by one each time an image is captured by the vision system.

In block 510, the temperature of the layer is estimated in individual images of the second plurality of thermal images. In one example, the median value of the temperature over the region of interest, as indicated by the second plurality of thermal images, is taken as the estimate of the layer's temperature. In another example, where there are multiple regions of interest in the layer, the regions of interest are categorized according to size, and weights are assigned to the temperature measurements of the regions of interest in accordance with their relative sizes.

In block 512, a prediction is made as to which pass of the second plurality of passes is depicted in individual images of the second plurality of thermal images, based on the median temperature estimate and on the direction of movement of the fusing carriage. In one example, knowing the median temperature in the region of interest (e.g., as estimated in block 410) along with the direction of movement of the fusing carriage in the thermal image (e.g., as determined based on the analysis performed by the method 300) may help to predict the pass assignment. However, if a prediction is still difficult to make, data regarding the temperature of the powder in the thermal image may assist in making the prediction.

Figure 7:
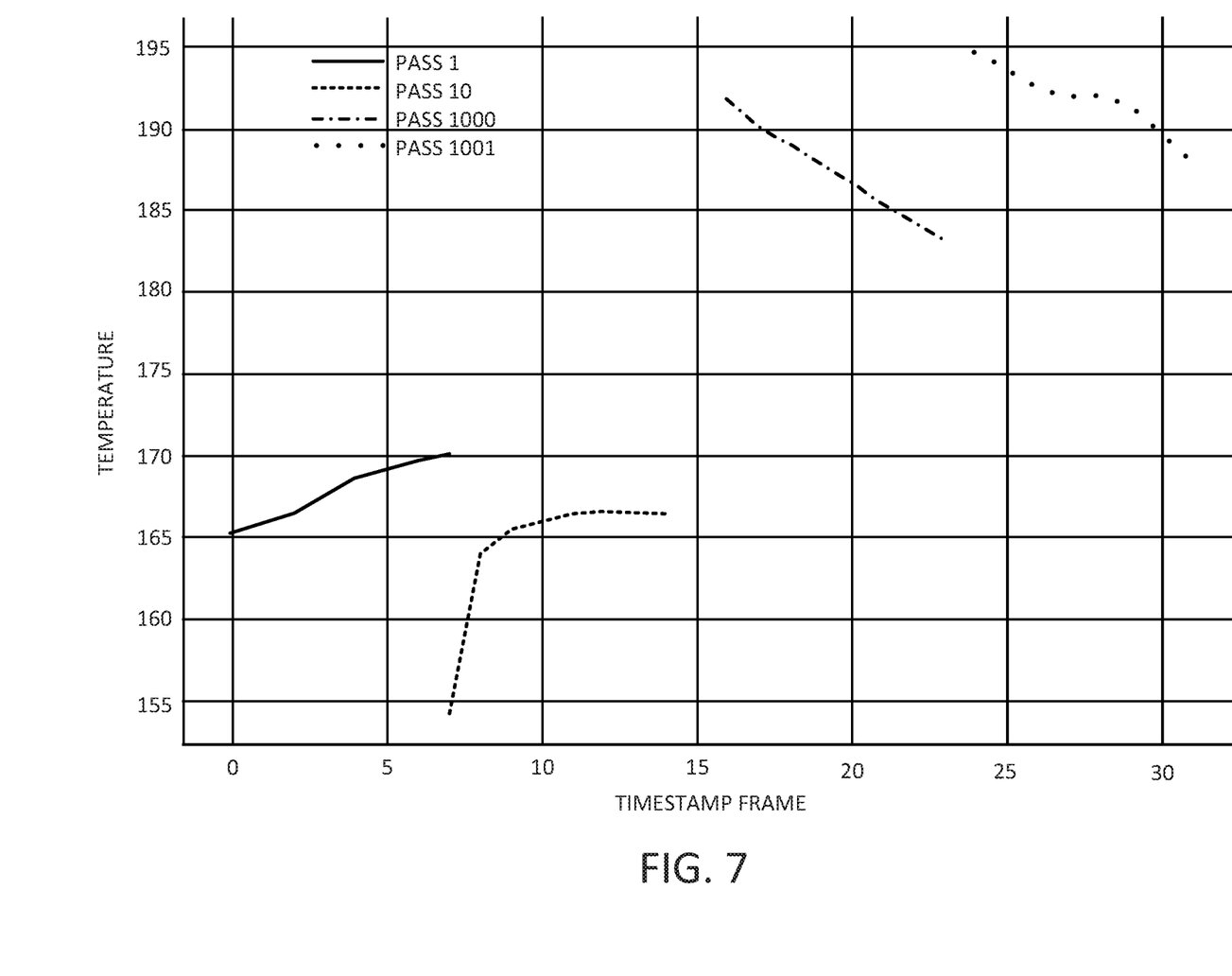
FIG. 7 illustrates an example chart plotting time versus temperature for a plurality of example passes of an additive manufacturing system.

In one example, a probability is associated with the prediction, where the probability represents a confidence in the prediction's accuracy. FIG. 7, for instance, illustrates an example chart plotting time versus temperature for a plurality of example passes of an additive manufacturing system across eight thermal images. The data in the chart may be acquired from execution of the method 300. Thus, the plurality of passes may be used to form a layer of a test object. As illustrated, the chart plots four example passes: pass 1, pass 10, pass 1000, and pass 1001.

In one example, for a given layer of the object being fabricated according to the method 500, the median temperature of each image is determined. Next, the median temperatures of the images may be incrementally sorted, e.g., from lowest to highest. Then, the sorted median temperatures may be compared to the temperature ranges that were observed during the fabrication of the text object. Thus, when comparing against the plurality of example passes illustrated in FIG. 7 the lowest median temperatures may be assumed to correspond to pass 10; the next set of median temperatures (moving from lowest to highest) may be assumed to correspond to pass 1; the next set of median temperatures may be assumed to correspond to pass 1000, and the highest set of median temperatures may be assumed to correspond to pass 1001. This approach may yield an approximately 33% (or 0.33) probability of correctly assigning a pass to an image. This probability may be increased to approximately 66% (or 0.66) by refining the pass assignments based on knowledge of carriage movement. If no information on carriage movement is available, then verification may be sought from a human operator.

In one example, if the probability assigned is above a predefined threshold (e.g., 75% or 0.75), then the pass prediction is automatically assigned to the thermal image. If, however, the probability is less than the predefined threshold, the assistance of a human operator may be sought in verifying the pass prediction.

The method 500 ends in block 514. However, the method 500 may be repeated for each layer of the second object, until fabrication of the second object is complete.

In some examples, less than all of the thermal images captured by the additive manufacturing system's vision system may be assigned to passes and/or layers.

It should be noted that although not explicitly specified, some of the blocks, functions, or operations of the methods 200, 300, and 500 described above may include storing, displaying and/or outputting for a particular application. In other words, any data, records, fields, and/or intermediate results discussed in the method can be stored, displayed, and/or outputted to another device depending on the particular application. Furthermore, blocks, functions, or operations in FIGS. 2, 3, and 5 that recite a determining operation, or involve a decision, do not necessarily imply that both branches of the determining operation are practiced.

Figure 8:
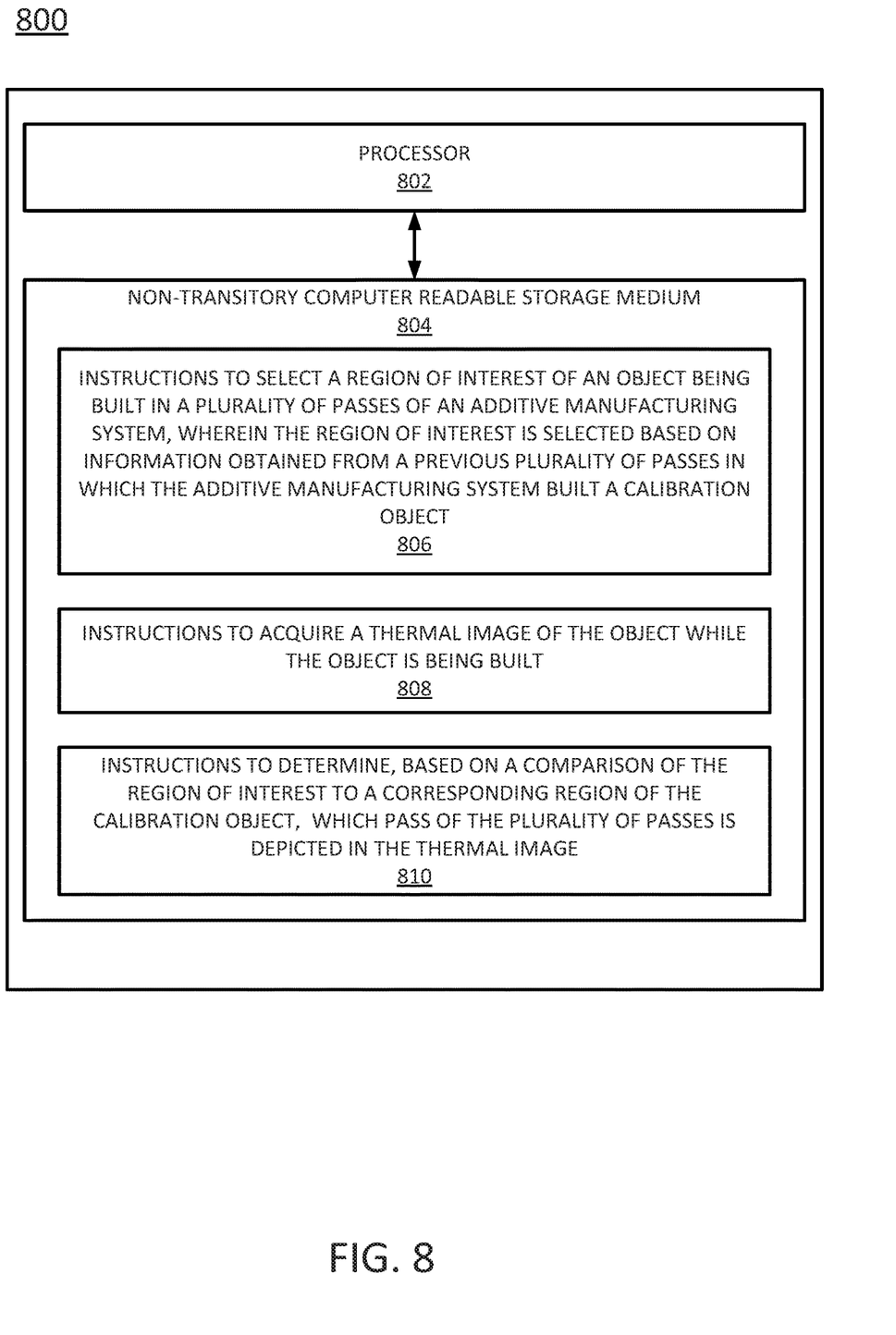
FIG. 8 depicts a high-level block diagram of an example computer that can be transformed into a machine capable of performing the functions described herein.

FIG. 8 depicts a high-level block diagram of an example computer 800 that can be transformed into a machine capable of performing the functions described herein. Notably, no computer or machine currently exists that performs the functions as described herein. As a result, the examples of the present disclosure modify the operation and functioning of the general-purpose computer to identify passes of additive manufacturing processes depicted in thermal images, as disclosed herein. In one example, the computer 800 may be the vision system 122 of FIG. 1. In one example, the computer 800 may include a processor 802 and a non-transitory computer readable storage medium 804.

The processor 802 may comprise a hardware processor element, e.g., a central processing unit (CPU), a microprocessor, or a multi-core processor. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

The present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

The non-transitory computer readable storage medium 804 may comprise a tangible or physical computer-readable storage device or medium, e.g., volatile memory, non-volatile memory, ROM memory, RAM memory, magnetic or optical drive, device or diskette and the like. More specifically, the non-transitory computer readable storage medium 804 may comprise any physical devices that provide the ability to store information such as data and/or instructions to be accessed by a processor or a computing device such as a computer or an application server.

The non-transitory computer readable storage medium 804 may include instructions 806, 808, and 810 that, when executed by the processor 802, cause the processor 802 to perform various functions. The instructions 806 may include instructions to select a region of interest of an object being built in a plurality of passes of an additive manufacturing system, wherein the region of interest is selected based on information obtained from a previous plurality of passes in which the additive manufacturing system built a calibration object. The instructions 808 may include instructions to acquire a thermal image of the object while the object is being built. The instructions 810 may include instructions to determine, based on a comparison of the region of interest to a corresponding region of the calibration object, which pass of the plurality of passes is depicted in the thermal image. When a hardware processor executes instructions to perform "operations", this could include the hardware processor performing the operations directly and/or facilitating, directing, or cooperating with another hardware device or component, e.g., a co-processor and the like, to perform the operations.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
   an image processing system to generate electronic signals based on a model of an object to be fabricated using an additive manufacturing process;
   a print engine to perform the additive manufacturing process in a plurality of passes based on the electronic signals, wherein the print engine comprises:
   a material coater to spread a powder coating material;
   a plurality of fluid ejection devices to eject a fusing agent; and
   an emitter to emit energy to fuse the fusing agent and the powder coating material into a layer of the object to be fabricated; and
   a vision system to acquire a plurality of thermal images of the plurality of passes and to assign individual passes of the plurality of passes to individual images of the plurality of thermal images based on data acquired during a build of a calibration object by the additive manufacturing process.

2. The apparatus of claim 1, wherein the data acquired during the build of the calibration object comprises temperature ranges present during the build of the calibration object.

3. The apparatus of claim 2, wherein the data acquired during the build of the calibration object further comprises a movement pattern of the plurality of fluid ejection devices and a movement pattern of the material coater.

4. The apparatus of claim 3, wherein the movement pattern of the plurality of fluid ejection devices occurs in a first region of interest of the build bed.

5. The apparatus of claim 4, wherein the movement pattern of the plurality of fluid ejection devices indicates a direction in which the plurality of fluid ejection devices is moving in an individual image of the plurality of thermal images.

6. The apparatus of claim 4, wherein the first region of interest comprises an area around a periphery of the build bed.

7. The apparatus of claim 2, wherein the temperature ranges present during the build of the calibration object are measured in a build bed of the additive manufacturing system.

8. The apparatus of claim 7, wherein the temperature ranges present during the build of the calibration object include
   a median value of a temperature in a first region of interest of the build bed, wherein the median value is identified according to an individual image of the plurality of thermal images, and wherein the vision system assigns an individual
   pass of the plurality of passes to the individual image of the plurality of thermal images based on a first temperature range of the temperature ranges that was present in a pass of a plurality of passes made during the build of the calibration object.

9. The apparatus of claim 8, wherein the first region of interest is selected based on knowledge of occlusions that are likely to be present in the plurality of thermal images, and wherein the knowledge is based on occlusions that are present in a plurality of thermal images acquired during plurality of passes made during the build of the calibration object.

10. The apparatus of claim 8, wherein the first region of interest is selected by scanning the build bed of the additive manufacturing system on a predefined set of regions of interest until multiple occurrences of temperature differences that at least meet a threshold temperature difference are detected.

11. The apparatus of claim 1, wherein the object to be fabricated and the calibration object are built using a same powder coating material and recipe.

12. The apparatus of claim 1, wherein the object to be fabricated is one of a plurality of identical objects that is to be fabricated during the plurality of passes.

* * * * *